United States Patent [19]

Gates

[11] 4,437,335

[45] Mar. 20, 1984

[54] GAUGE AND METHOD OF DETERMINING THE EXISTENCE OF IRREGULARITIES IN A SURFACE OF AN ARTICLE

[75] Inventor: Donald C. Gates, Troy, Mich.

[73] Assignee: Antares Engineering, Inc., Troy, Mich.

[21] Appl. No.: 326,728

[22] Filed: Dec. 2, 1981

[51] Int. Cl.³ .............................................. G01B 5/28
[52] U.S. Cl. ........................................ 73/37.9; 73/105
[58] Field of Search ...................... 73/37.9, 37.5, 105

[56] References Cited

U.S. PATENT DOCUMENTS

| | | | |
|---|---|---|---|
| 2,618,965 | 11/1952 | Gray | 73/105 |
| 2,669,864 | 2/1954 | Brewster | 73/37.9 |
| 3,438,244 | 4/1969 | Plumpe | 73/37.9 |
| 3,792,605 | 2/1974 | Rabenau | 73/37.9 |
| 3,793,875 | 2/1974 | Jurkiewicz | 73/37.9 |

FOREIGN PATENT DOCUMENTS

286242 8/1968 U.S.S.R. ............................. 73/37.5

Primary Examiner—Anthony V. Ciarlante
Attorney, Agent, or Firm—Cullen, Sloman, Cantor, Grauer, Scott & Rutherford

[57] ABSTRACT

A gauge for determining the existence of irregularities in a surface of an article includes a housing and a probe having a fluid outlet for the passage of fluid under pressure therethrough which is mounted within the housing for movement between neutral and a sensing position. The gauge further includes a sensor for detecting the pressure of the fluid in the sensing position of the probe. A micro switch, normally spaced from the probe is adapted to signal an extreme movement of the probe beyond the sensing position when no material of the part tested is present. A modified gauge replaces a probe valve and includes a control sleeve and a push arm which engages a second micro switch in the electrical circuit responding to any retraction of the probe. A method is also disclosed, including the steps of moving the probe between a neutral and sensing position and detecting the pressure of the fluid in the sensing position of the probe.

26 Claims, 13 Drawing Figures

GAUGE AND METHOD OF DETERMINING THE EXISTENCE OF IRREGULARITIES IN A SURFACE OF AN ARTICLE

BACKGROUND OF THE INVENTION (1) Field of the Invention

The instant invention relates to a method and apparatus for determining the irregularities in a surface of an article.

(2) Description of the Prior Art

In the manufacturing of various devices and parts, such as a head for an engine block, the part is predrilled and tapped to provide threaded holes for bolts for securing the part to another part. For example, threaded holes are drilled in the engine block so that the head can be secured thereto. After the predrilling and tapping operation, it is desirable to check each of the tapped holes to determine if the hole exists at all, whether the hole has been drilled to the proper depth, and whether or not the threads extend from the top of the hole to a predetermined depth thereof.

Devices have been constructed which include a probe having a fluid outlet and a back pressure sensor. The probe is inserted into the hole and the sensor detects increased back pressure within the probe caused by the absence of threads in the hole. These devices have been found to be ineffective in the workshop because unless the probe is specifically calibrated for a tight fit within the drilled hole, the back pressure differential between a threaded and nonthreaded hole is so small that the device cannot consistently differentiate therebetween.

The instant invention includes means for moving the probe between a neutral and a sensing position for increasing the pressure differential resulting between threaded and nonthreaded holes significantly, thereby solving Prior art example devices for pneumatically gauging parts, and in some cases threaded bores, are shown in one or more of the following U.S. Pat. Nos:

2,846,871 Worthen August, 1958
2,889,704 Baker June, 1959
3,438,244 Plumpe April, 1969
3,494,078 Miyamoto February, 1970
3,608,356 Rozovsky September, 1971
3,792,605 Rabenau February, 1974
3,793,875 Jurkiewicz February, 1974
4,187,715 Nevitt February, 1980

SUMMARY OF THE INVENTION

The instant invention provides a gauge for determining the existence of irregularities in a surface of an article. The gauge includes a housing, a probe having a fluid outlet for the passage of fluid under pressure therethrough, and means mounting the probe within the housing for movement between a neutral position and a sensing position. The gauge further includes a sensor for detecting the pressure of the fluid in the sensing position of the probe.

The instant invention further provides a method including the steps of moving the probe between a neutral and a sensing position and detecting the pressure of the fluid in the sensing position of the probe.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF A PREFERRED EMBODIMENT

Figure 1:
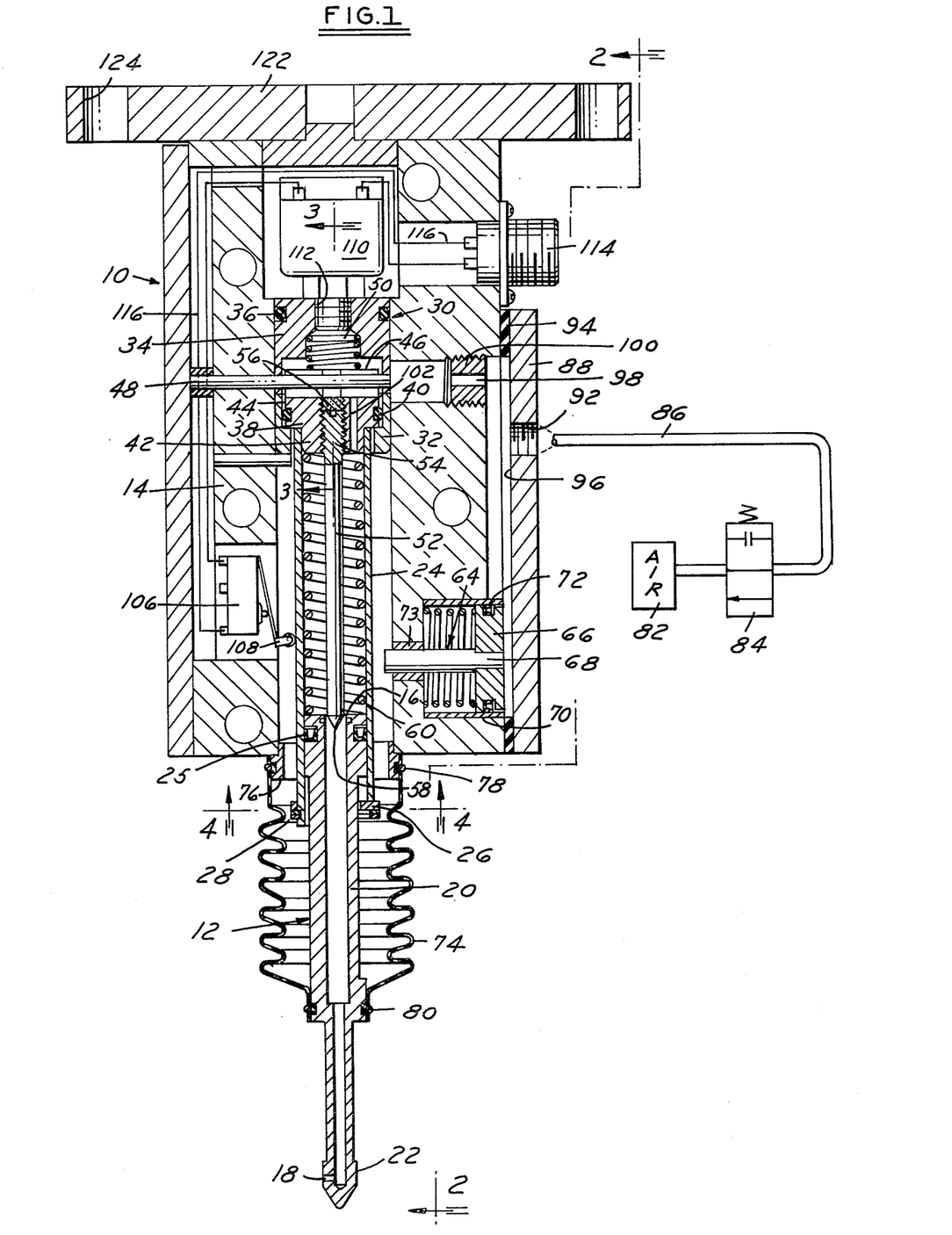
FIG. 1 is an elevational cross-sectional view of the instant invention.
Figures 2, 3, 4, 5, 6:
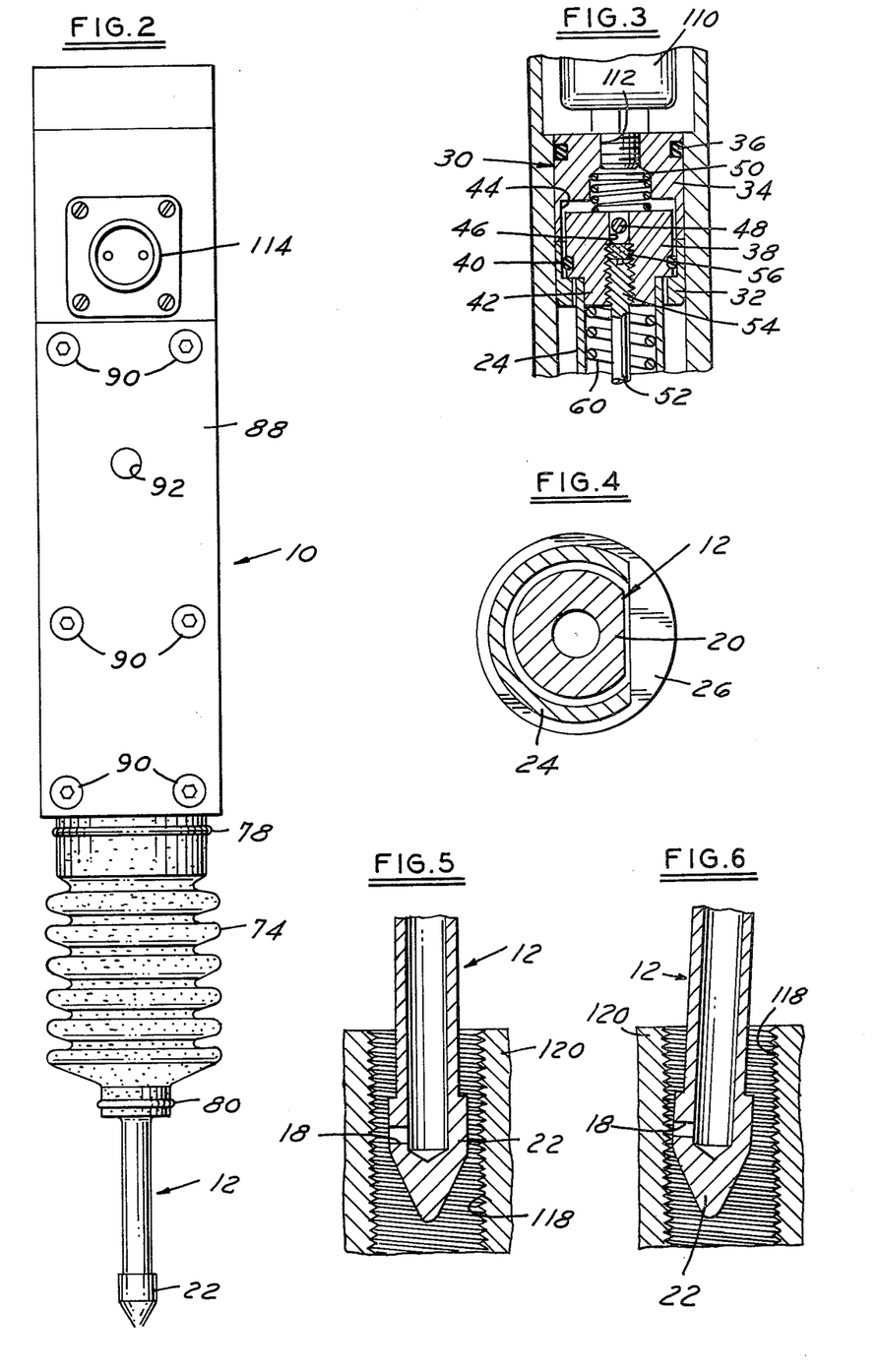
FIG. 2 is a side view of the instant invention taken substantially along lines 2—2 of FIG. 1.
FIG. 3 is a fragmentary cross-sectional view taken substantially along lines 3—3 of FIG. 1.
FIG. 4 is a cross-sectional view taken substantially along lines 4—4 of FIG. 1.
FIG. 5 is a cross-sectional view of the head portion of the probe of the instant invention disposed within a threaded bore, the probe being in the neutral position.
FIG. 6 is a cross-sectional view of the head portion of the probe disposed within a threaded bore, the probe being in the sensing position.

A gauge for determining the existence of irregularities in a surface of an article constructed in accordance with the instant invention is shown generally at 10. The gauge 10 includes a probe piston generally indicated at 12 mounted within a housing 14. The probe piston 12 includes a fluid inlet 16 and a fluid outlet 18. The probe piston 12 includes a body portion 20 which is D-shaped in cross-section as shown in FIG. 4. The probe piston 12 further includes a head portion 22 having a substantially conical outer surface. The head portion 22 includes the fluid outlet 18.

The probe piston 12 is disposed within and extends from one end of a sleeve 24. A seal 25, U-shaped in cross-section, is disposed between the probe piston 12 and sleeve 24. The probe piston 12 is variably axially movable within the sleeve 24 between an extended position (as shown in FIGS. 1 and 2) and a retracted position wherein the probe piston 12 slides substantially into the sleeve 24. As shown in FIG. 4, a D-shaped washer 26 is disposed about the end portion of the sleeve 24 and engages the D-shaped body portion 20 of the probe piston 12. The washer 26 is secured to the sleeve 24 by fittings 28. The flat surface of the washer 26 engages a flat surface of the body portion 20 of the probe piston 12, thereby preventing rotation of the probe piston 12 in relation to the sleeve 24.

The sleeve 24 is secured within the housing 14 at a pivot joint generally indicated at 30 and specifically at 32, 38. The pivot joint 30 allows the probe piston 12 to pivot between a neutral position, FIG. 5 and a sensing position, FIG. 6. The pivot joint 30 includes a female pivot means fixedly secured within the housing 14. The female pivot means includes a pivot seat 32 depending from a bulkhead member 34. The seat 32 includes a radially inwardly extending annular flange. A seal 36 is disposed between the bulkhead member 34 and the housing 14. The pivot joint further includes a male pivot member 38. The male member 38 includes a flange extending outwardly and radially therefrom. A seal 40 is disposed between the male member 38 and seat 32. The male member 38 includes a cylindrical portion 42, the sleeve 24 being force fitted onto the cylindrical portion 42. The flange of the male member 38 is seated upon the inwardly extending flange of the seat 32 whereby the flange of the male pivot member 38 rocks within the female pivot means so as to pivot the probe piston 12 between a neutral and sensing position, FIGS. 5 and 6. More specifically, the female pivot means, consisting of the seat 32 and bulkhead member 34, defines a space 44, FIG. 3, the male member 38 being disposed within the space 44 and seated upon the inwardly extending flange of the seat 32. The male member 38 can rock within the space 44 so as to allow for a pivoting movement of the probe piston 12.

The male pivot member 38 includes a groove 46 therethrough. A pin 48 is disposed within the groove 46 and engages the housing 14 for preventing rotation of the male pivot member 38. A spring 50 is disposed within the bulkhead member 34 and engages the male pivot member 38 in compression for centering the male pivot member on the seat 32 and for allowing the rocking movement of the male pivot member 38 within the female pivot means. Thus, the probe piston 12 is pivoted between the neutral position wherein the male pivot member 38 is seated on the flange of the seat 32 and the sensing position wherein the male pivot member 38 rocks within the space 44 of the female pivot means.

A second pin member 52 includes a first threaded end portion 54 engaging a threaded opening in the male pivot member 38. Generally, the pin member 52 is screwed into the threaded hole of the male pivot member 38, and a small amount of glue or latex 56 is used to secure the pin 52 in place. The pin member 52 further includes a second conical end portion 58 which is spaced from the fluid inlet 16 of the probe piston 12 when the probe piston 12 is in the extended position and variably substantially disposed within the fluid inlet 16 when the probe piston 12 is in the retracted position. The pin member 52 is positioned within the male pivot member 38 to calibrate the position of the conical end portion 58 in relation to the fluid inlet 16 of the probe piston 12.

A second spring member 60 is disposed within the sleeve 24 and includes a first end engaging the male pivot member 38 and a second end engaging the probe piston 12 for urging the probe piston 12 toward the extended position, FIG. 1.

A thrust rod, generally indicated at 64, having a piston portion 66 and a rod portion 68, is movably mounted within the housing 14 for variably moving the probe piston 12 from the neutral position of FIG. 5 to the sensing position, FIG. 6. A sleeve 70 defines a cylinder through which the rod 68 moves. A seal 72, U-shaped in cross-section, is disposed between the piston portion 66 and the sleeve 70. A second sleeve 73 is disposed between the rod 68 and housing 14, as shown in FIG. 1.

A bellows member 74 is disposed about the probe piston 12 for preventing foreign particles from entering the housing 14. An extension 76, secured to the housing 14, has an annular groove thereabout. A wire 78 engages the top portion of the bellows 74 against the annular groove about the extension 76, thereby securing the top portion of the bellows 74 to the housing 14. The lower portion of the bellows 74 is secured to an annular groove about the body portion 20 of the probe piston 12 by a wire 80 in a similar fashion.

A source of air schematically shown at 82 communicates with a suitable valve 84 for selectively supplying air under pressure through a conduit 86 to the interior of the housing 14. As shown in FIG. 2, a plate member 88 is secured by screws 90 to the housing 14, the plate member 88 including a fluid inlet 92. Resilient gasket members 94 are disposed between the plate member 88 and the housing 14 so as to define a passageway 96 therebetween. The passageway 96 branches at the fluid inlet 92. A first passageway leads through a bore 98 in a threaded insert 100 to the inner space 44 of the female pivot means. The male pivot member 38 includes a bore 102 therethrough which allows communication between the space 44 within the female pivot means to the inner area of the sleeve 24. The inner area of the sleeve 24 is in fluid communication with the fluid inlet 16 of the probe piston 12, the probe piston 12 having a passageway leading from the fluid inlet 16 to the fluid outlet 18. The second branch of the passageway 96 leads to the face of the piston portion 66 of the thrust rod 64.

A microswitch generally indicated at 106 includes an arm 108 engaging the sleeve 24. Thus, the microswitch 106 senses extreme pivoting movement of the piston probe 12.

A pressure switch 110 is mounted above the female pivot means and is operatively in fluid communication with the inner area 44 of the female pivot means by an opening 112 in the bulkhead member 34. The microswitch 106 and pressure switch 110 are connected in series to an electrical outlet 114. The electrical connector 114 has leads or wires 116 which interconnect in series the limit switch 106 and pressure switch 110.

In operation, the gauge 10 can be used in an assembly line operation where workpieces are positioned in front of a single gauge 10 or a plurality of similar gauges. The gauges are mounted on a manifold so that one or several of the gauges are positioned in a predetermined arrangement so as to correspond with bores drilled into the workpieces that are about to be tested.

As shown in FIGS. 5 and 6, the gauge 10 is moved so that the head portion 22 of the probe piston 12 is inserted into the hole 118 of the workpiece 120 to be tested. The air supply 82 is actuated by valve 84 to supply air through the passageway 96 and against the face of the piston portion 66 of the thrust rod 64 to move the thrust rod 64 laterally to engage the sleeve 24 and thereby pivot the sleeve 24 and probe piston 12 about the pivot joint 38, 32. Thus, as shown in FIG. 6, the probe piston 12 is moved to the sensing position whereby the fluid outlet 18 of the head portion 22 is thrust against the surface of the bore 118 of the workpiece. Simultaneously, a burst of air travels through the passageway 96, through the bore 98 of the insert member 100, through the inner area 44 of the female pivot means, through the bore 102 and the sleeve 24, and into and out of the probe piston 12 through the fluid outlet 18. If a thread exists in the bore 118 of the workpiece 120, as shown in FIGS. 5 and 6, there will be little restriction of the air escaping from the fluid outlet 18. If, on the other hand, the bore 118 is not threaded, then the thrust rod 64 will force the fluid outlet 18 directly against the surface of the bore 118, and the passage of air through the fluid outlet 18 will be blocked. Thus, a back pressure within the air passageways is created and sensed by the pressure sensor 110, thereby creating or generating a signal through the electrical outlet 114 which can be detected by an appropriate warning light or fed into a computer system.

It is essential that the fluid outlet 18 be parallel to and facing away from the thrust rod 64 for the proper operation of the subject invention. Thus, the D-shaped washer 26 provides an anti-rotation means preventing rotation of the probe piston 12 within the sleeve 24. Additionally, the pin 48 provides an additional anti-rotation means by preventing rotation of the male pivot member 38 within the female pivot means 30.

If the workpiece does not have a hole (blind hole) or a hole is of insufficient depth, the probe piston 12 will abut the undrilled surface and be forced up into the sleeve 24. The conical end portion 58 of the pin 52 will substantially block the fluid inlet 16 of the probe piston 12. Thus, a back pressure is created within the fluid passageway by the air which is unable to escape through the blocked fluid inlet 16 and such back pressure is detected by the pressure switch 110 as previously described.

Thus, the instant invention provides a means for indicating at least three abnormalities commonly found in workpieces, i.e., no hole, hole not deep enough or no threads. Of course, the instant invention can be used for various other uses such as testing the outer threads of a workpiece or a series of threaded portions within a single bore within a workpiece. Additionally as shown in FIG. 2, the subject gauge is quite narrow so that several gauges constructed in accordance with the instant invention could be laterally aligned quite closely for inspecting holes in a workpiece which are close to each other.

Due to the pivoting movement of the probe piston head 22, a single probe piston head can be used with bores having various sizes. Additionally, the probe piston head 22 can be made in various sizes to accommodate a wide variety of bore sizes. Thus, a single gauge constructed in accordance with the instant invention can be adapted for a variety of applications.

As previously stated, several gauges constructed in accordance with the instant invention can be mounted on a single manifold for detecting and testing a plurality of holes within a single workpiece. An upper plate member 122, secured to the housing 14, includes a plurality of bores 124 for receiving bolts, the bolts securing the gauge 10 to the manifold. A single air supply can be used through the manifold to actuate a plurality of gauges. In other words, a single burst of air from an air source 82 can be used to simultaneously actuate all of the gauges connected to the single manifold.

The instant invention further includes the method of determining the existence of irregularities in a surface of an article with a gauge constructed in accordance with the instant invention by moving the probe piston between the neutral and sensing positions and detecting the pressure of the fluid within the probe when in the sensing position.

MODIFIED GAUGE

Figure 7:
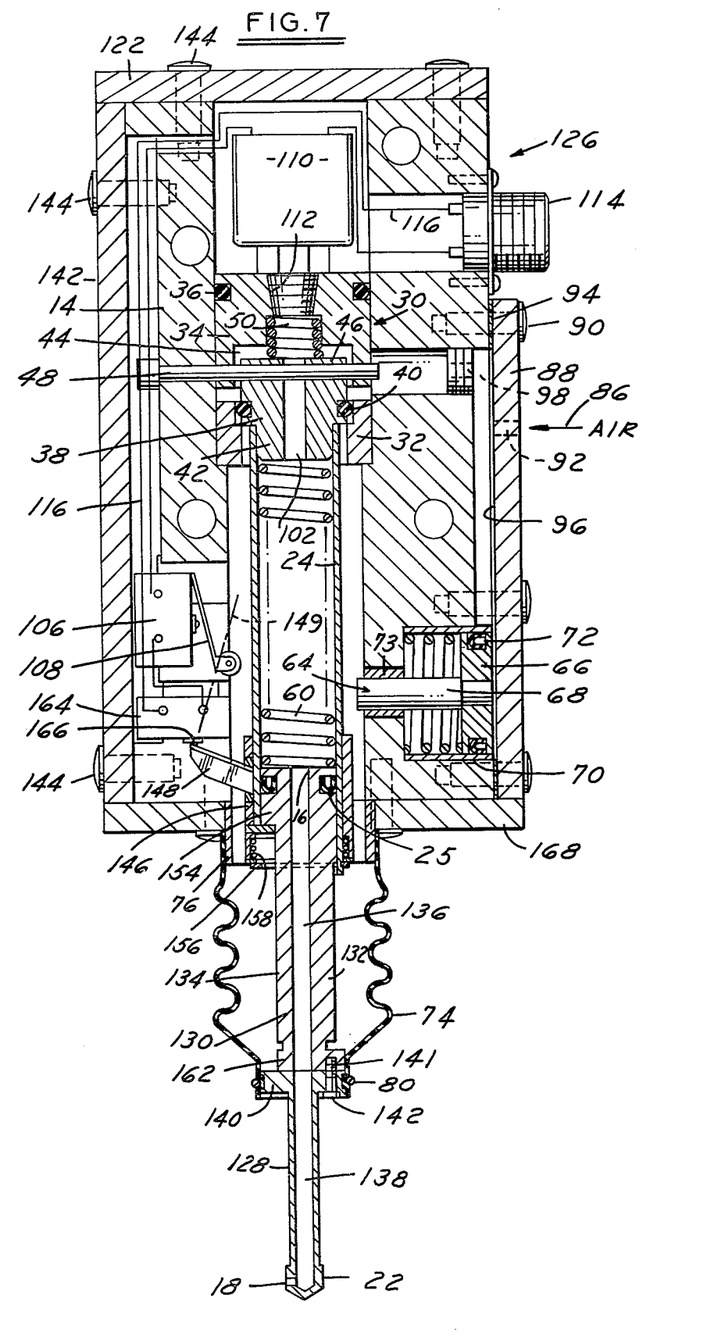
FIG. 7 is an elevational cross-sectional view of another embodiment of the instant invention or gauge.

A modified gauge 126 is shown in FIGS. 7 through 13 which operates similarly to the function and operation of the gauge 10 described with respect to FIGS. 1 through 6. The corresponding sleeve 24 supportably and yieldably suspends a probe 128 similar to the probe 12 shown in FIG. 1, except that probe 128 having a longitudinal bore 138 outletting at 18 and at one end has a mount flange 140 which bears against end flange 162 of probe piston 130. The flange 142 is secured to the end flange 162 by a plurality of fasteners 142 as shown in FIG. 7. Such fasteners project into apertures 141, FIGS. 7 and 11 within the end flange 162 of probe piston 130.

Probe piston 130 has a body portion 132 and upon one side has a flat face portion 124 defining a D-cross sectional shape, said body portion having a longitudinal bore 136 which is in registry with bore 138 of probe 128. A number of the parts in the gauge 126, FIG. 7, are the same as the gauge 10 in FIG. 1 and their description is omitted.

The construction of the probe body 132 is similar to the probe body 20 shown in FIG. 1, and terminates at its upper end in the fluid inlet 16. This is the same as shown in FIG. 1, for receiving pressurized air in the manner above described from the air pressure line 86, schematically shown in FIG. 7. This provides a simplified means by which probes 128 of predetermined different dimensions may be replaced and interchanged merely by removal of the screws or fasteners 142. Thus the probes 128 are separate from probe body portion 132 while in gauge 10 of FIG. 1 the probe is an integral part of the probe body 20.

In the gauge 126 of FIG. 7, there are included cover plates 88 and 142, upper plate 122 and bottom plate 168 secured to the housing 14 as by a plurality of fasteners 144. In the embodiment shown in FIG. 7, pressure regulating valve rod 52 of FIG. 1 has been eliminated as the means for detecting and indicating any retraction or movement of the probe 128.

In the event that the bore 118 or dimension of a workpiece to be gauged or the thread thereon is at a depth less than the predetermined required depth for a particular bore and thread or in the case of the absence of a bore, retraction of the probe activates micro switch 164. In the embodiment shown in FIG. 1, retraction of the probe 12 together with such tilting of the probe member 12 about its pivotal support 30 creates a backpressure in the chamber 44 so as to activate pressure switch 110 to signal the absence of a hole or a hole of incorrect depth.

In the gauge shown in FIG. 7, a hole of the incorrect depth or the absence of a hole, bore, or other dimension is nevertheless indicated since the probe 128 will retract longitudinally within the sleeve 24 against the action of spring 60. This retraction instead of controlling the flow of fluid operates the second microswitch 164 mounted within or upon housing 14. For this purpose, there is provided a control sleeve 146, FIGS. 7, 8, 11 and 13 which is slidably positioned upon sleeve 24 adjacent its lower end and yieldably mounted thereon.

Figures 11, 12, 13:
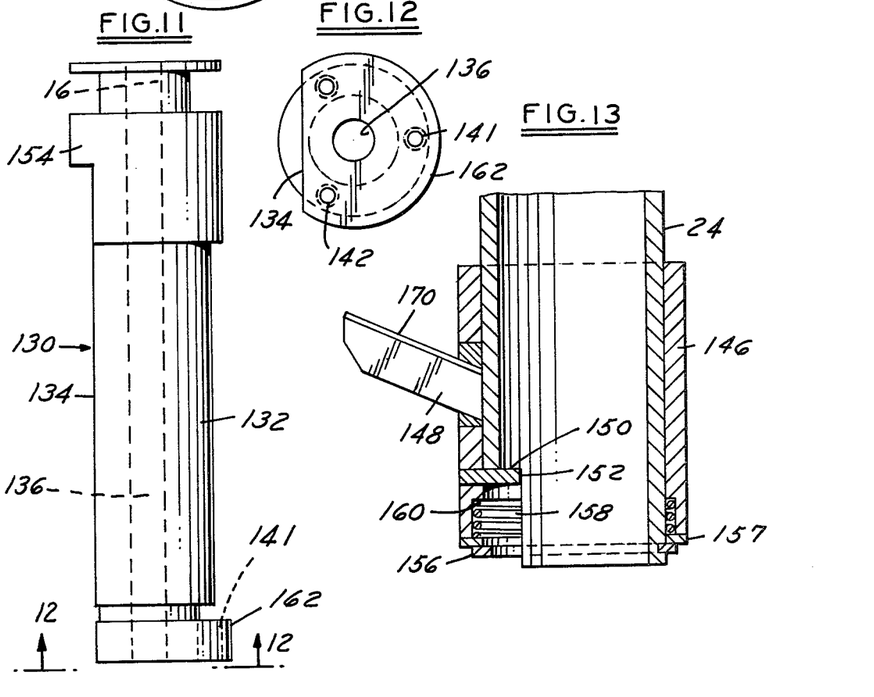
FIG. 11 is an elevational view of the probe piston.
FIG. 12 is a bottom view of the probe piston, taken on the line 12—12 of FIG. 11.
FIG. 13 is a fragmentary cross-sectional view of the control sleeve mounted upon the sleeve member shown in FIG. 7.

As shown in FIG. 13, the snap ring 156 is mounted within an annular groove at the lower end of sleeve 24 and supportably engages washer 157. Coil spring 158 is interposed between washer 157 and the undercut annular shoulder 160 formed within control sleeve 146. The spring biased head 154 of probe body 130 bears against the key 150 provided on the control sleeve 146. Accordingly, any upward retracting movement of the probe body 130 permits a limited retracting movement of the control sleeve 146 and the connected pusher arm 148.

The pusher arm 148 at one end is secured to the control sleeve 146 and extends upwardly at an acute angle with respect to the control sleeve as shown in FIGS. 7 and 13.

As viewed in the assembly, FIG. 7, pusher 148 extends in a direction which is tangent to radius 149 which extends between control button 166 of the microswitch 164 and the pivotal mounting of the cylinder portion 42 of the male pivotal member 38, with respect to pivot seat 32, forming a part of the female portion of the pivot assembly.

The reason for this construction is that upon pivotal movement of the probe 128 including the sleeve 24 with respect to the pivot mount 32, 38 to a "sensing" position, corresponding tilting movement of the pusher 148 will not operatively engage the microswitch push button 166 so as to provide a false signal.

On the other hand, should there be any retracting movement of the probe 128 relative to the sleeve 24, as where "no hole" exists or where the hole is of the incorrect depth, a retraction movement of approximately 0.025 inches is sufficient for the pusher 148 to activate the push button 166 of the microswitch 164. This would indicate a rejection of a particular part through the electrical circuit containing the leads or wires 116 and the connector 114.

Figure 8:
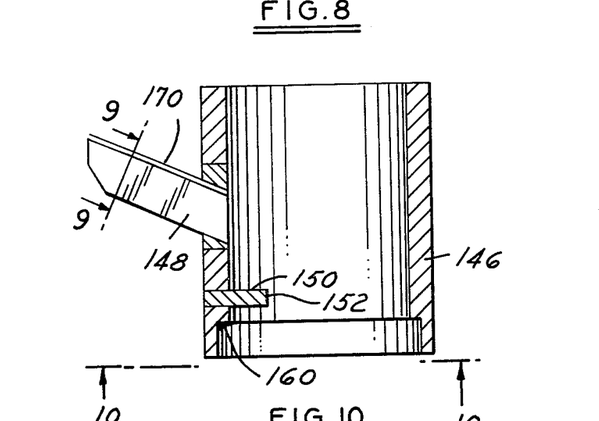
FIG. 8 is an elevational view of the control sleeve and pusher arm, partly in section, which are unseparated in the gauge of FIG. 7.
Figure 9:
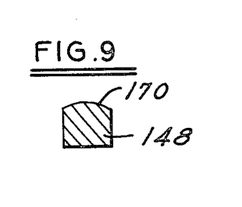
FIG. 9 is a sectional view through the pusher arm, taken on the line 9—9 of FIG. 8.
Figure 10:
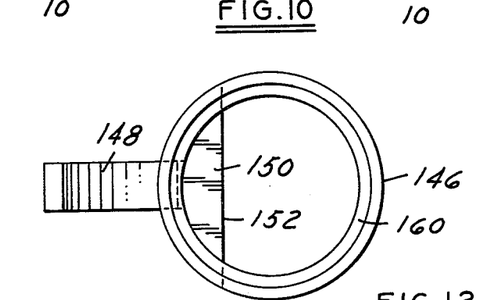
FIG. 10 is a bottom view of the control sleeve and pusher arm, taken on the line 10—10 of FIG. 8.

The top surface of the pusher 148 is transversely convex as at 170, FIG. 9, to limit the surface engagement of the pusher arm 148 with respect to the push button 166 of micro switch 164. Accordingly, this further prevents a false operation of the microswitch, including any side movement of the control sleeve 146 which might otherwise activate the microswitch 164. As best shown in FIGS. 8 and 13 transverse key 150 is mounted upon an interior portions of control sleeve 146 and has a straight edge 152 shown in FIG. 10.

The corresponding probe piston 130 has a flat surface portion 134, FIG. 11, which is in cooperative engaging registry with the key 150. By this construction, relative rotation between sleeve 24 and the control sleeve 146 is prevented. This provides a means of preventing the pusher arm 148 from moving laterally out of registry with respect to the microswitch 164. It further assures that the pusher arm 148 is at all times diametrically opposed from the rod portion 68 which is employed for tipping the probe 128 to a "sensing position".

Furthermore, by the construction shown in FIGS. 7 and 13, the probe body 132 is retained against relative rotation with respect to sleeve 24 and the control sleeve 146. As above described, the transverse pin 48 is anchored within the housing 14 and nested within the transverse slot 46 at the upper end of the male pivotal member 38. This prevents relative rotation of member 38 with respect to housing 14.

With respect to FIGS. 7 and 11, upon the upper end of the probe body portion 132 there is a shoulder 154 which bears upon the key 150 to prevent any upward movement of the control sleeve 146, unless or until there is some retracting movement of the probe 128.

Therefore, as distinguished from the embodiment shown in FIG. 1, retracting movement of the probe 128 does not control air pressure, but on the other hand, such retraction activates the microswitch 164, which through the electrical circuit containing the lead 116 and the connector 114 provides the proper signal to show a defective effective part, such as a bore "less than the required depth" or a part having "no bore" where a bore is expected to be or a part having "no threads" where threads are required.

The instant invention has been described in an illustrative manner, and it is to be understood that the terminology which has been used is intended to be in the nature of words of description rather than limitation.

Obviously, other modifications and variations of the present invention are possible in light of the above teachings. It is, therefore, to be understood that within the scope of the appended claims, the invention may be practiced otherwise than as specifically described.

Having described my invention, reference should now be had to the following claims:

I claim:

1. A gauge for determining the existence or irregularities in a surface of an article comprising:
    a housing;
    a probe means having a fluid outlet for the passage of fluid under pressure therethrough;
    means mounting said probe means within and spaced from the side walls of said housing for movement between a neutral position and a sensing position;
    a sensor means within said housing for detecting the pressure of the fluid in said sensing position of said probe means; and
    a thrust rod located within said housing on one side of said probe means and being reciprocally movable and engageable with said probe means for selectively urging said probe means towards said sensing position, said fluid outlet of said probe means being closely parallel to the movement of and opening away from said thrust rod.

2. A gauge as set forth in claim 1 wherein said mounting means includes a pivot joint for allowing said probe means to pivot between said neutral position and said sensing position.

3. A gauge as set forth in claim 2 wherein said pivot joint comprises a female pivot means fixedly secured with said housing and a male pivot means, said probe means being operatively connected to said male pivot means.

4. A gauge as set forth in claim 3 wherein said female pivot means includes a radially inwardly extending first flange, said male pivot means including a second flange extending outwardly and radially therefrom, said second flange being seated upon said first flange and within said female pivot means whereby said second flange of said male pivot means rocks within said female pivot means so as to pivot said probe means between said neutral position and said sensing position.

5. A gauge as set forth in claim 4 wherein said mounting means includes anti-rotation means for preventing relative rotation between said fluid outlet of said probe means and thrust rod.

6. A gauge as set forth in claim 5 wherein said male probe means includes a groove therethrough, said anti-rotation means including a first pin member disposed within said groove having an end portion engaging said housing.

7. A gauge as set forth in claim 5 including a first spring disposed within said female pivot means engaging said male pivot member for biasing said probe means towards said neutral position.

8. A gauge as set forth in claim 5 wherein said sensor means includes a pressure switch mounted above said female pivot means whereby said pressure switch detects back pressure resulting from said fluid outlet of said probe means abutting a surface when said probe means is moved to said sensing position.

9. A gauge as set forth in claim 8 wherein said male pivot means includes a male pivot member having a cylindrical portion and a sleeve member fixedly frictionally engaging said cylindrical portion of said male pivot member, said probe means being disposed within and extending from said sleeve member and variably axially movable therewithin between an extended position and a retracted position.

10. A gauge as set forth in claim 9 including a spring member disposed within said sleeve member for urging said probe means to said extended position.

11. The gauge as set forth in claim 3, said probe means having a body with a longitudinal bore and an apertured end flange;
a probe having a bore in registry with said body bore and including said fluid outlet;
and an apertured mount flange on said probe removably secured to said end flange.

12. A gauge as set forth in claim 1 wherein said mounting means includes a sleeve member, said probe means being disposed in and extending therefrom and variable axially movable therewithin between an extended position and a retracted position.

13. A gauge as set forth in claim 12 wherein said mounting means includes anti-rotation means for preventing relative rotation between said probe means and said sleeve member.

14. A gauge as set forth in claim 13 wherein said probe means includes a body portion being D-shaped in cross-section, said anti-rotation means including a D-shaped washer member disposed about said sleeve member and engaging said body portion for preventing rotation of said probe means in relation to said sleeve member.

15. A gauge as set forth in claim 1 wherein said probe means includes a probe fluid inlet, said mounting means including a pin member having a conical end portion spaced from said fluid inlet when said probe means is in said extended position and variably substantially disposed within said fluid inlet when said probe means is in said retracted position.

16. A gauge as set forth in claim 1, including a micro switch disposed within said housing for sensing when said probe means is in any retracted position from its extended position.

17. A gauge as set forth in claim 16, including another micro switch connected in series with said first mentioned micro switch disposed within said housing for sensing when said probe means is pivoted beyond its sensing position.

18. A gauge as set forth in claim 1, including a micro switch disposed within said housing for sensing when said probe means is pivoted beyond its sensing position.

19. A gauge for determining the existence of irregularities in a surface of an article comprising;
a housing;
a probe means having a fluid outlet for the passage of fluid under pressure therethrough;
means mounting said probe means within said housing for movement between a neutral position and a sensing position;
a sensor means for detecting the pressure of the fluid in said sensing position of said probe means;
a thrust rod being reciprocally movable and engageable with said probe means for selectively urging said probe means towards said sensing position;
said fluid outlet of said probe means being closely parallel to the movement of and opening away from said thrust rod;
said mounting means including a pivot joint for allowing said probe means to pivot between said neutral position and said sensing position;
said pivot joint comprising a female pivot means fixedly secured with said housing and a male pivot means;
said probe means being operatively connected to said male pivot means;
said female pivot means including a radially inwardly extending first flange, said male pivot means including a second flange extending outwardly and radially therefrom, said second flange being seated upon said first flange and within said female pivot means whereby said second flange of said male pivot means rocks within said female pivot means so as to pivot said probe means between said neutral position and said sensing position; and a micro switch disposed within said housing for sensing when said probe means is pivoted beyond said sensing position.

20. A gauge as set forth in claim 19 wherein said probe means includes a body portion being D-shaped in cross-section, said anti-rotation means including a D-shaped washer member disposed about said sleeve member and engaging said body portion for preventing rotation of said probe means in relation to said sleeve member.

21. A gauge as set forth in claim 19 wherein said probe means includes a probe fluid inlet, said gauge including a pin member having a first end portion secured to said male pivot member and a second end portion spaced from said probe fluid inlet when said probe means is in said extended position and variably substantially disposed within said probe fluid inlet when said probe means is in said retracted position.

22. A gauge as set forth in claim 19 including a spring disposed within said sleeve member between said male pivot member and said probe means for urging said probe means to said extended position.

23. A gauge for determining the existence of irregularities in a surface of an article comprising;
a housing;
a probe means having a fluid outlet for the passage of fluid under pressure therethrough;
means mounting said probe means within said housing for movement between a neutral position and a sensing position;
a sensor means for detecting the pressure of the fluid in said sensing position of said probe means;
a thrust rod being reciprocally movable and engageable with said probe means for selectively urging said probe means towards said sensing position;
said fluid outlet of said probe means being closely parallel to the movement of and opening away from said thrust rod;
said mounting means including a pivot joint for allowing said probe means to pivot between said neutral position and said sensing position;
said pivot joint comprising a female pivot means fixedly secured with said housing and a male pivot means;
said probe means being operatively connected to said male pivot means;
said female pivot means including a radially inwardly extending first flange, said male pivot means including a second flange extending outwardly and radially therefrom, said second flange being seated upon said first flange and within said female pivot means whereby said second flange of said male pivot means rocks within said female pivot means so as to pivot said probe means between said neutral position and said sensing position;

said mounting means including anti-rotation means for preventing relative rotation between said fluid outlet of asaid probe means and thrust rod;

said sensor means including a pressure switch mounted above said female pivot means whereby said pressure switch detects back pressure resulting from said fluid outlet of said probe means abutting a surface when said probe means is moved to said sensing position;

said male pivot means including a male pivot member having a cylindrical portion and a sleeve member fixedly frictionally engaging said cylindrical portion of said male pivot member;

said probe means being disposed within and extending from said sleeve member and variably axially movable therewithin between an extended position and a retracted position; and a micro switch disposed within said housing for sensing when said probe means is in any retracted position from its extended position.

24. In the gauge as set forth in claim 23, a control sleeve slidably mounted upon said sleeve member;

a radial key on said control sleeve engageable with said probe means;

said probe means yieldably retaining said control sleeve against retraction relative to said sleeve member;

and a pusher arm on said control sleeve normally spaced from said micro switch;

any retraction of said probe means permitting retraction of said control sleeve and pusher arm to operatively engage said micro switch.

25. In the gauge as set forth in claim 24, said micro switch having a retractable button;

the top of said push arm being transversely convex and normally spaced from said button;

whereby normal tilting of said probe means does not engage said pusher arm with said button, unless there is retraction of said probe means relative to said sleeve member.

26. The gauge as set forth in claim 25 said gauge including a second micro switch connected in series with said first micro switch disposed within said housing for sensing when said probe means is pivoted beyond its sensing position.

* * * * *